(12) United States Patent
Saint Clair et al.

(10) Patent No.: US 7,615,737 B2
(45) Date of Patent: Nov. 10, 2009

(54) HIGH PRECISION COMPACT ROTATION ANGLE ABSOLUTE ENCODER

(75) Inventors: Jonathan M. Saint Clair, Seattle, WA (US); Bing Wen, Camarillo, CA (US); Jian Ma, Thousand Oaks, CA (US); Mitchell D. Voth, Lake Tapps, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/745,693

(22) Filed: May 8, 2007

(65) Prior Publication Data

US 2008/0277570 A1 Nov. 13, 2008

(51) Int. Cl.
*G01D 5/34* (2006.01)
(52) U.S. Cl. .............................. 250/231.13; 250/231.18
(58) Field of Classification Search ................................
250/231.13–231.18, 237 G; 356/616–620; 33/1 PT, 1 N; 341/11, 13
See application file for complete search history.

(56) References Cited

U.S. PATENT DOCUMENTS

| 4,465,373 | A | * | 8/1984 | Tamaki et al. ............... 356/617 |
| 4,987,299 | A | * | 1/1991 | Kobayashi et al. ...... 250/231.14 |
| 5,237,391 | A | * | 8/1993 | Huggins ..................... 356/617 |
| 6,564,168 | B1 | * | 5/2003 | Hasser ....................... 702/163 |
| 2006/0091304 | A1 | * | 5/2006 | Saint Clair ............. 250/231.13 |

* cited by examiner

*Primary Examiner*—Georgia Y Epps
*Assistant Examiner*—Jennifer Bennett
(74) *Attorney, Agent, or Firm*—Haynes and Boone, LLP.

(57) ABSTRACT

An angle absolute encoder comprises a code rod encoded with code marks configured in segments, such that each successive segment has an increasing number of code marks, arranged at an angle to the rotation axis depending on the number of code marks in each segment. The angle of the code mark is determined by the number of code marks in the respective segment, the width of the segment parallel to the rotation axis of the code rod and the radius of the code rod. The angular resolution increases according to the number of code marks in each segment. Light is reflected from or transmitted through the code marks and detected by a light detector to determine absolute angle position.

32 Claims, 4 Drawing Sheets

HIGH PRECISION COMPACT ROTATION ANGLE ABSOLUTE ENCODER

BACKGROUND

1. Field of the Invention

The present invention relates generally to measuring devices and, more particularly, to absolute encoders for providing position information.

2. Related Art

Optical encoders are well known and employed for a variety of applications to detect position. An optical encoder measures a position of an object, either angular or linear, by optically detecting marks on a scale attached to the object to move with the object. In the simplest form, the encoder simply measures translation by counting the number of marks that move past the encoder's optical detector. One type of optical encoder is commonly known as an absolute encoder, which has the ability to recognize the position of a movable object without reference to a base, home, or starting position. In a conventional absolute encoder, each position is given by a unique code pattern of marks which identifies the absolute position, as opposed to just one mark. A change in position is sensed by detecting a change in the code bits which make up the code pattern.

In general, optical absolute rotary encoders are provided with a light source, a rotary code disk and fixed plate, and light receiving elements, such as photodetectors. A code disk typically has apertures, slits, or other transparencies distributed over the area of the disk. The angular and radial coordinates of the transparencies on the disk are known, and this two dimensional information is used to provide higher angular resolution and range than the finite physical size an individual aperture could provide. The apertures are typically arranged in concentric annular rings, with each ring having a sequence of apertures, generally at the same radius and at equal angular intervals. The code disks are fixed to a rotating element of the assembly, and the optical detectors and light sources are attached to a fixed element. Variations on this theme exercise different illumination and detection arrangements and different shapes and distributions of apertures.

In a typical operation, the portion of light from the light source passing through light passage portions provided in the rotary code disk and slits provided in the fixed plate is converted into electric signals by the photodetectors, which is decoded, for example, by referring to a look-up table, thereby allowing detection of the angle of rotation and the position of rotation. The light passage portions of the rotary code disk are comprised of a plurality of concentric code patterns and a reference pattern. The slits of the fixed plate are provided corresponding to the code patterns and reference pattern. To increase accuracy or precision, the number of light passage portions and slits are increased, which also increases the cost, complexity, and physical package size of the encoder.

Measurement applications are currently requiring higher and higher degrees of angular precision, e.g., less than a few microradians. Current high precision encoders, such as the Model BS-0001, built by Automated Precision Inc. of Gaithersburg, Md. use a compact gimbal stage and have a pointing accuracy of less than 2 microradians in each of two axes. Other types of high precision encoders, such as one built by Dr. Johannes Heidenhain, able to provide approximately 0.17 microradian resolution. However, such high precision encoders have the disadvantage of being large in size, e.g. greater than 6" in diameter.

SUMMARY

According to one aspect of the present invention, an absolute encoder uses a code rod, instead of a code disk, for precisely measuring in real time the rotation angle of a mechanical rotary stage. The encoder comprises a cylindrical rod attached to a rotating element and a high density linear photodetector array which detects the image of a code pattern via light reflected from (or transmitted through) a code pattern on the surface of the code rod.

In one embodiment, the encoder includes a stationary linear photodetector array placed in close proximity to a cylindrical rod having an encoded surface that is attached co-axially to the rotating element of a mechanical rotation stage. The linear photodetector array detects light reflected from the code markings on the encoded cylinder. A cylindrical lens equal in length to (or longer than) the linear array may be used to image cylinder markings on to the array. The linear array is attached to the fixed element of the rotation stage. Alternatively, the cylindrical lens may be replaced by a linear micro-lens array, where the periodicity and placement of each micro-lens is matched to each element of the photodetector array.

The encoded portion of the surface of the cylinder is as long as the sensing portion of the linear array and is marked with a sequence of two or more line code segments. The line shape may be a top hat function in absorption, reflectivity, or transmissivity. It may also be Gaussian, a sine function, or a random, pseudo-random, or Gray code.

The code segments divide the 360 degrees of rotation of the cylinder into contiguous arc segments according to the number of code lines in the segment. Each succeeding code segment has a higher angular resolution by repeating the code lines in a smaller angular rotation interval, i.e., some decreasing (integer) fraction of 360°. The first code segment comprises a single diagonal line ($n_1=1$) disposed to wrap cylindrically about a drum mounted to the rod in a spiral fashion, so that the line advances to traverse a first set number of photodetector elements in a single rotation of the rod. The point of traverse along the photodetector linear array provides the information for determining the angular location of the rod. The physical arrangement of the segments does not have to following the sequence of increasing resolution successively from one segment to the next.

The second code segment contains $n_2$ lines, arranged diagonally on the drum, thus traversing a second set number of photodetector elements $n_2$ times in the course of one complete rotation of the rod. The second set of photodetector elements is adjacent to and apart from the first set of photodetector elements. The lines of the second code segment thus divide up the 360° of angular rotation into $n_2$ angular sectors and do not overlap when traversing the photodetector line array. Thus only one code line within a particular segment traverses the photodetector array at a time, and one code line from each segment traverses the photodetector at any instant.

A third code segment may contain $n_3$ lines, wherein $n_3$ is an integer number $N_3$ times the number of lines in the second code segment arranged diagonally, i.e., the total number of lines in the third code segment is then $n_3=n_2 \times N_3$. In general, the jth code segment contains $n_j=n_{j-1} \times N_j$ lines.

The angular range of rotation of the first code segment is $\theta(1)=360°$, the angular range covered by each diagonal line in the second code segment is $\theta(2)=360°/n_2=\theta(1)/n_2$. In general, a jth code segment contains $n_{j-1} \times N_j$ lines, and each line in the code segment covers an angular rotation of $\theta(j)=360°/n_j=\theta(j-1)/N_j$.

Furthermore, one or more of the jth code segments may be replicated identically, except that the phase angle of the replicated segment may be offset rotationally (not shown) by a selected fraction of $\theta(j)$ to remove ambiguity that may arise due to simultaneous signals detected at the end of one line in the jth code segment and the beginning of the next line.

A selected group of the sensor elements at one or both ends of the linear photodetector array are dedicated to imaging one or two registration lines, arranged circumferentially around the encoder drum, i.e., perpendicular to the encoder rod rotation axis. They provide reference locations for determining the angle between the encoder pattern axis and the rod rotation axis and to account for misalignment wobble, according to the position of signal responses detected by the pixel elements of the photodetector linear array for the reference lines. The remaining sensor elements are used to detect the image of the lines of each code segment, and thereby to measure with increasing precision with succeeding code segments of increasing line count the encoder angular position.

Using a cylindrical code rod allows absolute encoders to achieve higher accuracies at smaller radial sizes as compared with code disks. For example, to achieve good resolution (e.g., 0.01" or 48 nanoradians) with the Renishaw RESR series requires a ring that is about 413 mm in diameter. To achieve the same resolution and much better accuracy with a 12 bit system using the present invention requires a rod that is only 55 mm in diameter. In another example, the MicoE Systems M3500 encoder requires an optical diameter of 4 inches to get to 2 arc seconds. The present invention may be able to achieve more than 10 times better accuracy for a diameter of the code rod of only 2 inches.

Furthermore, because the code rod has a much smaller diameter than code disks and a relatively short length, the size of bearings and bearing pre-load required may also be reduced. This potentially leads to a smaller polar moment of inertia, which is directly proportional to the square of the radius and proportional to the mass. The smaller polar moment would be advantageous to the control side of the design.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1B:
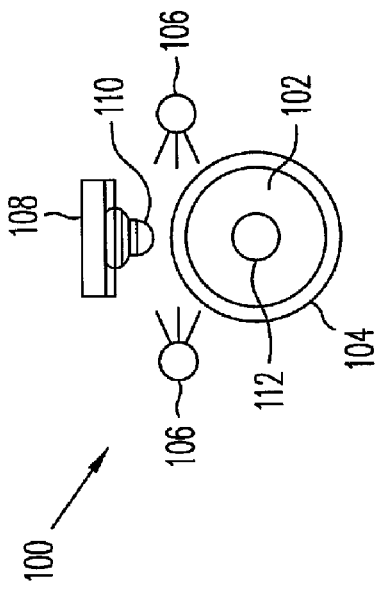
FIGS. 1A and 1B show side and end views, respectively, of an absolute angle encoder according to one embodiment of the present disclosure.
Figure 1A:
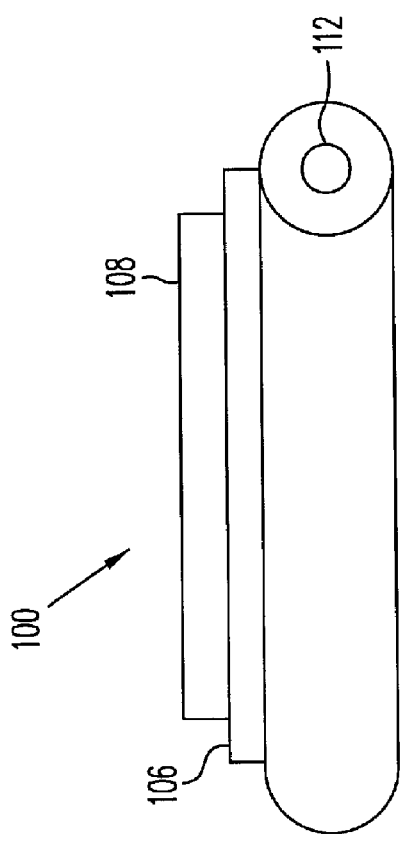

FIGS. 1A and 1B show side and end views, respectively, of an absolute angle encoder 100 according to one embodiment of the present invention. Encoder 100 includes a cylindrical rod 102 having an encoded surface 104. Light sources 106, such as an array of light emitting diodes, are positioned along the length of rod 102. Light emitted from light sources 106 is reflected from encoded surface 104 and detected by a light detecting linear array 108, such as an array of photodetectors. A cylindrical lens 110 is located between linear array 108 and rod 102. Alternatively, the cylindrical lens may be replaced by a linear micro-lens array (not shown), where the periodicity and placement of each micro-lens is matched to each element of the photodetector array.

A drive shaft 112 rotates rod 102. As rod 102 rotates, the encoded pattern on encoded surface 104 shifts. Encoded surface 104 position is detected by linear detector array 108 to determine an absolute angular position, as will be discussed in more detail herein.

Figure 2A:
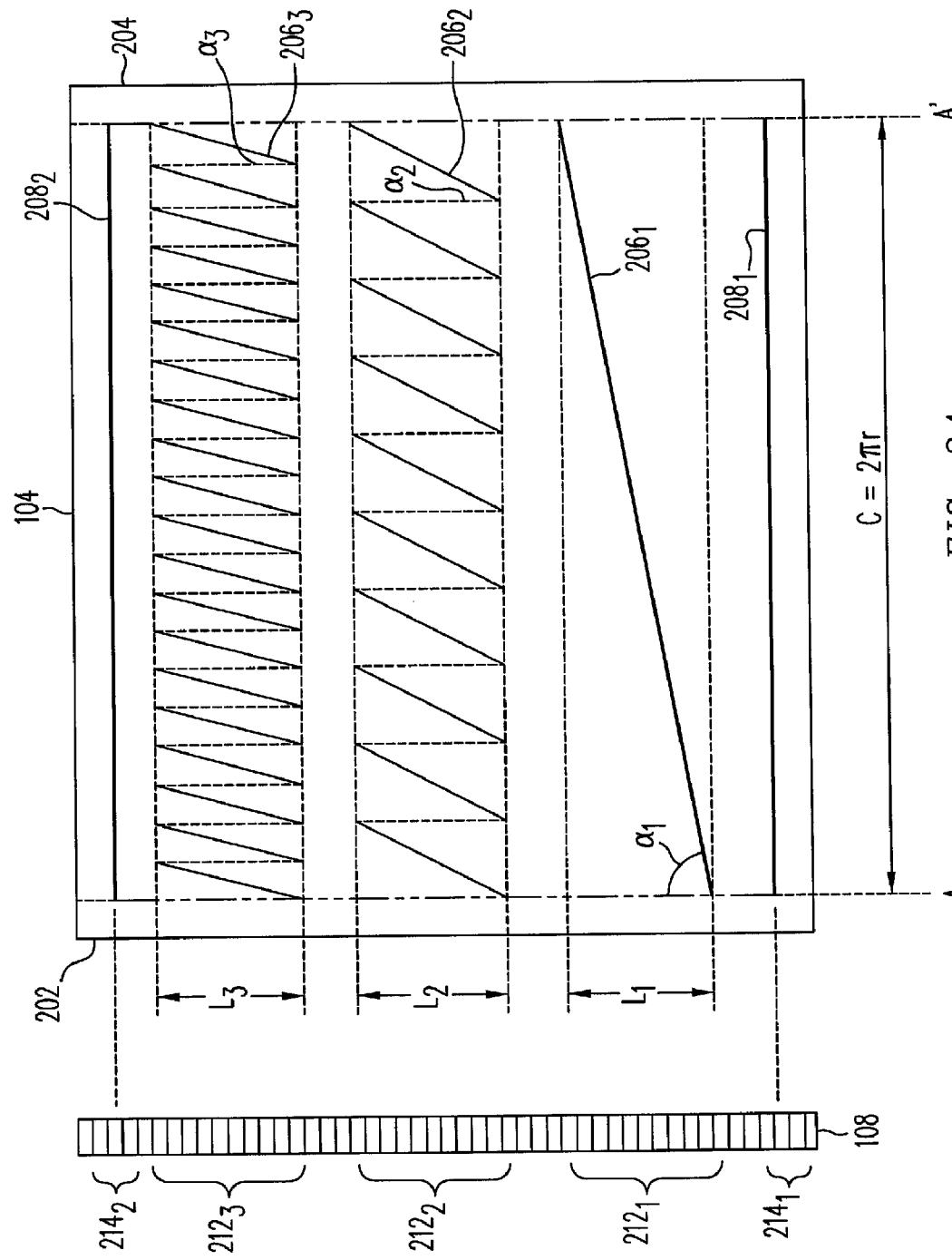
FIG. 2A shows one embodiment of an encoded surface of the code rod.

FIG. 2 shows an embodiment of encoded surface 104 according to one embodiment. In this embodiment, surface 104 is encoded with a top hat function. FIG. 2 shows surface 104 "unrolled" from rod 102, where side edge 202 and side edge 204 are brought together so that lines A and A' overlap and align in coincidence to form the cylinder shape, i.e., the rotational axis of the drive shaft or rod is in the vertical direction, parallel to lines A and A'. The circumferential dimension (shown horizontally in the "unrolled" representation, i.e., perpendicular to the rotation axis) of encoded surface 104 is $C=2\pi r$, where r is the radius of the cylindrical surface on which encoder surface 104 is formed. One or two registration lines $208_1$ and/or $208_2$ may be provided as references from which all code marks are measured to determine angular position of the encoder, which will be described in more detail below.

The encoded portion of surface 104 has a length, in the vertical direction, approximately the same as the sensing portion of linear detector array 108 and is marked with a plurality of coded line segments. For exemplary purposes, FIG. 2 shows three code segments 206, containing a plurality of code lines $206_1$, $206_2$ and $206_3$, respectively. In each respective code segment 206, code lines $206_j$ are oriented at an angle $\alpha_j$ with respect to the rotational axis of encoder 100. As can be seen, when the number of code lines $206_j$ within a code segment is increased, the angle $\alpha_j$ becomes smaller. The width (i.e., parallel to the rotation axis) of the $j^{th}$ code segment 206 is $L_j$, where, for simplicity, $L_j$ may be chosen to be the same dimension for each code segment 206, or $L_j$ may be different for each code segment 206. $L_j$ may be conveniently chosen to span a set number of photodetector pixel elements (e.g., 1024) defining portion $212_j$ of linear detector array 108.

The angle $\alpha_j$ (in radians) is given by equation (1):

$$\alpha_j = \tan^{-1}((2\pi r/n_j) \ast L_j), \tag{1}$$

where r is the radius of the rod 102 at encoder surface 104, $L_j$ is the width of the jth code segment, $n_j$ is the number of code lines $206_j$ in the jth code segment 206, and the circumferential dimension $2\pi r$ is divided up into $n_j$ sections.

For example, assuming an encoder rod 102 has a radius of r=1.5 cm, in the case where the first code segment $206_1$ has one diagonal code line (i.e., $n_1=1$), and $L_1=1$ cm, then angle $\alpha_1=\tan^{-1}((2\pi*1.5/1)*1)=\tan^{-1}(3\pi)=1.465$ rad=83.9°. For the $2^{nd}$ code segment $206_2$ (assuming $L_2=1$ cm and $n_2=8$), $\alpha_2=\tan^{-1}((2\pi*1.5/8)*1)=\tan^{-1}(3\pi/8)=49.7°$. Similarly, a third code segment $206_3$ containing $n_3=64$ lines would have an angle $\alpha_3=\tan^{-1}(3\pi/64)=8.4°$.

Concurrently, each traversal of linear detector array 108 by a single code line in code segment $206_j$ corresponds to an encoder rod 102 rotation angle $\theta(j)=360°/n_j$. For the example described above, $\theta(1)=360°$, $\theta(2)=45°$, and $\theta(3)=360°/64=5.625°$.

Furthermore, one or more of the jth code segments may be replicated identically, except that the phase angle of the replicated segment may be offset rotationally (not shown) by a selected fraction of $\theta(j)$ to remove ambiguity that may arise due to simultaneous signals detected at the end of one line in the jth code segment and the beginning of the next line.

In one embodiment, each line is defined spatially as a top-hat function in absorption, reflectivity, or transmissivity. In other embodiments, the line shape may be Gaussian. In yet other embodiments, the absorption, reflectivity, or transmissivity from line to line within a code segment may be a density sine function offset to have a minimum value of 0 and a normalized maximum value of 1.

In FIG. 2, linear detector array 108 is designated in the exemplary embodiment with five portions $212_1$, $212_2$, $212_3$, $214_1$ and $214_2$. Portions $212_j$, comprising the majority of linear detector array 108, are used to image code segment lines $206_j$, respectively, and thereby to measure angular rotation with increasing precision, as $n_j$ increases, when encoder rod 102, with encoder surface 104, has rotated. Portions $214_1$ and/or $214_2$ may be dedicated to imaging registration lines $208_1$ and/or $208_2$, respectively, thus enabling an accurate determination of the angular position of encoder pattern 104, axial wobble and angular misalignment wobble according to the detection of the relative location of each line of each code segment along linear detector array 108 with respect to registration lines $208_1$ and/or $208_2$. For example, array 108 can have thousands of pixels, e.g., 4096. Portion $214_j$ may then comprise variously, for example, from 100 to 200 sensor elements at the end(s) of the linear array, leaving the remainder for sensing each code segment, e.g., 1024 pixels for each of three code segments, with adequate isolation between segments.

It is the variation in intensity along the linear photodetector array that encodes the resolution measurement of the angle. A code line in a code segment is oriented at an angle $\alpha$ to the code rod axis to induce the detected intensity variation along the array. Rotating the code rod about its symmetry axis, which is parallel to the linear array, changes the pattern of variation of intensity on the array in a regular and well defined way. That is, the point of intersection of the code lines of code segments $206_j$ and the line defined by portion $212_j$ of linear detector array 108 corresponds to the angle $\alpha_j$, and the point of intersection moves along the linear array as the rod rotates. In FIG. 2, this is equivalent to sliding pattern 104 horizontally across array 108.

The position that the image of the each line segment occupies on linear detector array 108 is measured by image processing techniques. With proper illumination, and contrast in the markings (e.g., black (or white) painted marks on a white (or black) background), the centroid of the line image on the array is a measure of the angular position of the cylinder. In the above example, for the third code segment, at the beginning of a segment of an 8.4° arc of rotation, the image will show a centroid near one end of the array, say at pixel 1. At the end of the 8.4° arc segment, the centroid will be at the other end of the array, say at pixel 1024. The centroid will be found at any position in between, depending on the angular position of the rotation stage. In addition, though portions $212_j$ may be separated by detector pixels in portions of linear detector array 108 that are not positioned facing code segments $206_j$ they may, nevertheless, be included for purposes of calculating the centroid, especially at the beginning and end of an arc segment. Furthermore, the location of portions $212_j$ need not be considered to be at fixed locations on linear detector array 108, but may alternatively be considered to be in fixed relation to the detected centroids of reference lines $208_1$ and/or $208_2$ by portions $214_1$ and/or $214_2$. By locating the centroid to subpixel accuracy, the 8.4° interval can be divided into resolution higher than the locations of the 1024 pixels. This is enabled by the grayscale resolution of the detector pixels, e.g., 12 bit digital resolution. According to references in the open literature (see, for example, "Optical superresolution using solid state cameras and digital signal processing", P Seitz, Optical Engineering, July 1988, Vol. 27, No. 7), the measurement of the location of a line edge is possible with uncertainty $\Delta p$ of 1/140 pixel in a single frame. This corresponds to an encoder resolution given by equation (2):

$$\Delta\phi_j=2\pi*\Delta p/(n_j*(K_j)), \quad (2)$$

where $n_j$ is the number of code lines in code segment $206_j$ pairs, and $K_j$ is the number of pixels allocated to read code segment j In the above example for the $3^{rd}$ segment, $\Delta\phi=2\pi/(64*1012*140)$ radians=0.69 microradians. Note that the resolution improves as the number of pixels increases and also as the number of code lines increases.

In the embodiment of FIG. 2, two reference lines $208_1$ and $208_2$ are shown on encoder rod surface 104, which enable both the misalignment angle between the encoder pattern 104 axis and the rotation rod 102 axis to be decoded from the difference in locations of the code lines in each segment and the reference lines imaged onto linear detector array 108 and axial slip motion of rod 102 in a direction parallel to linear detector array 108. Axial slip will result in both reference lines $208_1$ and $208_2$ shifting along linear detector array 108 by the same amount, thereby preserving the same difference in locations of reference lines $208_1$ and $208_2$, which have a known separation.

An angular misalignment of encoder rod surface 104 with respect to the axis of rod 102 may be detected as a difference in location of reference lines $208_1$ and $208_2$ that is different from the known separation between reference lines $208_1$ and $208_2$ due to angular misalignment of encoder rod surface 104. This is referred to as wobble. A correction scaling factor based on the difference in the measured and known differences in location of reference lines $208_1$ and $208_2$ may be applied to correct for angular misalignment wobble. If angular misalignment of encoder rod surface 104 is negligible, or below a selected tolerance limit, only one of reference lines $208_1$ and $208_2$ may be required on encoder rod surface 104.

Using reference lines $208_1$ and/or $208_2$ may add to the uncertainty in the measurement (in the sense that statistical error in position location of both a reference line and a code line may result in a statistical error that is greater than that of a single line measurement) and slows down the measurement, but conversely allows the encoder precision to be much less affected by wobble of the rotary stage by virtue of numerical correction.

An ambiguity may arise in determining the absolute angle when a transition is made from the end of one code line in a segment $206_j$ to the beginning of the next adjacent code line. This may occur because the image of a code line is finite (as will be discussed below) and portion $212_{j'}$ will simultaneously detect the end of one code line at one end of portion $212_{j'}$, and the beginning of the next code line at the other end of portion $212_{j'}$. This may result in an erroneous calculation that the average position of the intensities measured fall at the center of portion $212_{j'}$, instead of at the correct end.

Figure 2B:
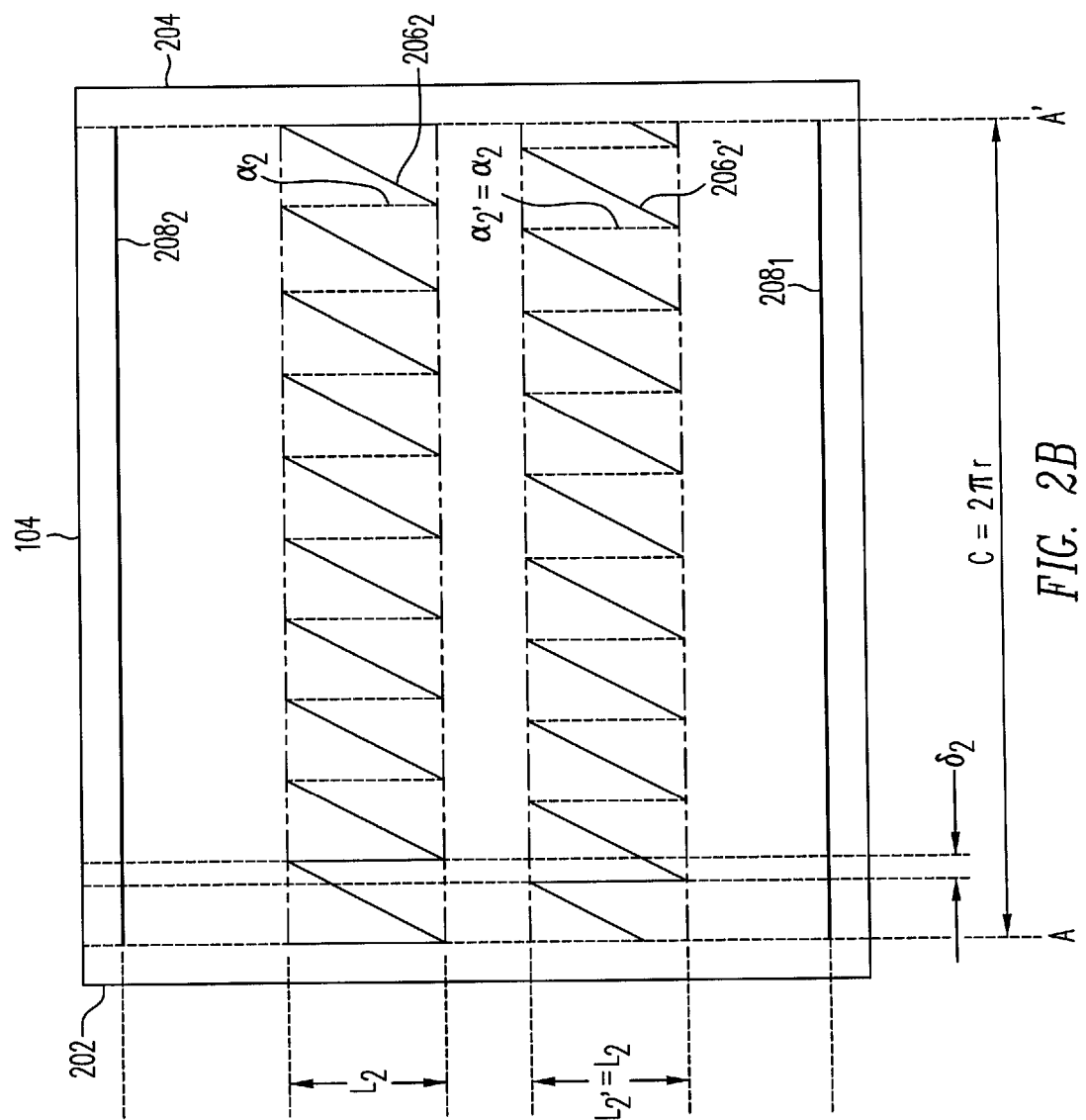
FIG. 2B shows a relative offset of two encoder segments having the same number of encoder marks, according to another embodiment of the present disclosure.

Referring to FIG. 2B, the ambiguity may be removed by duplicating segments $206_j$ with known rotational offsets corresponding to a fraction of a code line, thus providing a segment $206_{j'}$ with an offset relative to $206_j$ by an amount $\delta_j$ which corresponds to a known angular difference. For example, the code lines of segment $206_2$ are duplicated to provide the code lines of segment $206_{2'}$ with a relative offset of $\delta_2$. Comparing the measured angular positions of code lines in both segments $206_2$ and $206_{2'}$ resolves the ambiguity, since the two lines cannot be simultaneously in the same position to produce an ambiguous reading.

Figure 3:
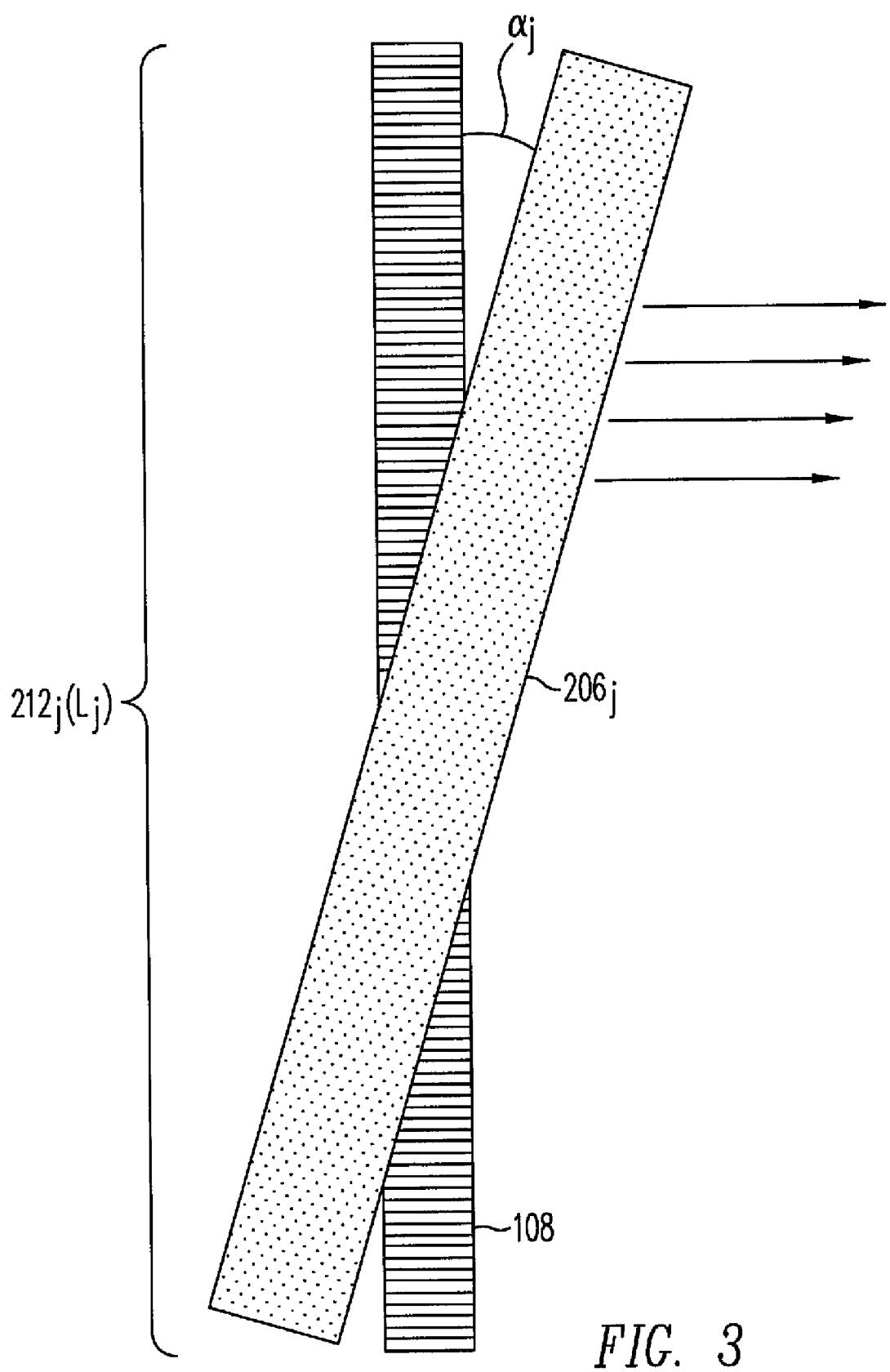
FIG. 3 shows an image of a code line from one code segment of FIG. 2A on a linear array of FIGS. 1A and 1B.

FIG. 3 shows an image of a code line in one code segment $206_j$, assuming that the lines themselves are black on a white background. The inverse situation of white line pairs on a black background is also easily implemented. The widths of the code lines do have constraints.

In an example where each code line (as shown in FIG. 3) can be regarded as a top hat intensity step function (i.e., a step from white-to-black-to-white), code lines in each code segment $206_j$ can be thought of as a square wave pattern rotated at an angle with respect to the cylinder axis. There are several approaches to extracting the intersection point of fine code line 206 with linear array 108. The most straightforward is by a centroid calculation, which is just the first moment of the intensity distribution along detector array, limited to portion $212_j$. Another approach locates the edges of the line on the array and analytically calculates the midpoint. Additional processing methods may be employed. For example, when encoder rod 102 is at a position where a transition is made from the end of one line in the segment to the beginning of the next line, a $2^{nd}$ order moment calculation may determine that the centroid (a $1^{st}$ order moment) is not erroneously calculated to be substantially at the center of the portion $212_j$ of the line array dedicated to detecting code segment $206_j$. Other methods of determining centroid location may also be used.

For a Gaussian intensity line shape, the tilted line is also a Gaussian on the linear array. Fitting the pixel data to a Gaussian and extracting the center of the Gaussian as the encoded angle is still another approach. The results of a simulation of the Gaussian fit angle measurement are given below in Table 1. The simulation assumed the following: the number of pixels is 6 times the expected width, the line is centered on those pixels, and there are 200 code segments. Table 1 shows the results for a signal to noise ratio of 50 dB using the Levenberg-Marquardt technique for nonlinear least squares:

TABLE 1

| Number of Pixels | Angle error (radians) | Width (pixels) |
|---|---|---|
| 18 | 7.86 × 10E−9 | 3 |
| 288 | 15.7 × 10E−9 | 48 |
| 1152 | 62.9 × 10E−9 | 192 |

One disadvantage of the discrete top-hat code line intensity profile is that as the number of code lines increases, the angle the code line makes with the rod becomes smaller (for fixed rod diameter), and the width of the line detected along the length of the detector then becomes larger, as $1/\sin(\alpha_j)$. Since the narrower the line width, the less the uncertainty in the line location, the number of lines trades off against the width for encoder resolution. In some limit, the detected line width is a significant fraction of the linear array segment length. Therefore, curve-fitting to a Gaussian curve may be advantageous. Additionally, other intensity patterns, such as a periodic sine or other function, may be similarly adapted to obtain accurate absolute angular position.

With code patterns discussed above (or any other suitable code pattern), the encoded code rod can be formed, in one embodiment, by attaching a coded sheet or film around the rod. The coded sheet may be removable. Any misalignment of the code sheet during the attachment process can be calibrated out using conventional methods. For different applications, it is a relatively simple matter to apply a different code sheet and provide a corresponding software algorithm adapted to decode the pattern and resolution of the code sheet. Fabrication can also be performed by laser scribing, electroforming, simple milling, photolithography, and simple printing.

Figure 4B:
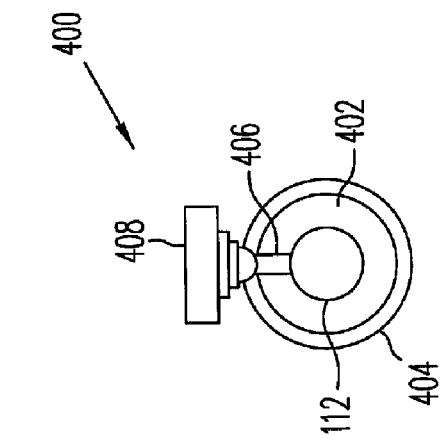
FIGS. 4A and 4B show side and end views, respectively, of an absolute angle encoder according to another embodiment of the present disclosure.
Figure 4A:
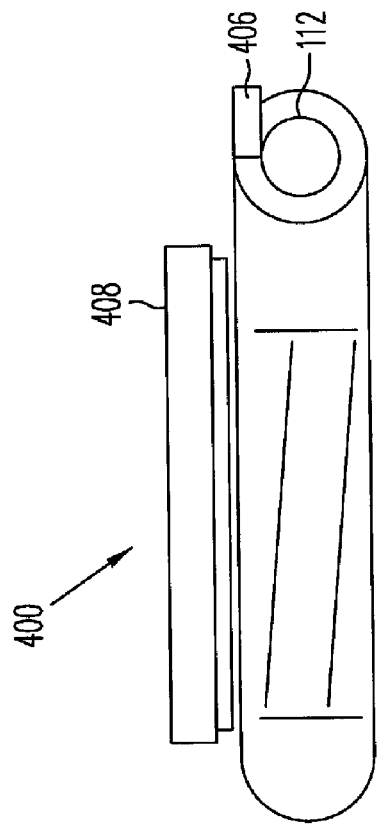

FIGS. 4A and 4B show side and end views, respectively, of an absolute angle encoder 400 according to another embodiment of the present invention. As with encoder 100 of FIGS. 1A and 1B, encoder 400 includes a cylindrical rod 402 having an encoded surface 404 and a light detecting linear array 408. However, instead of being a solid reflective rod, cylindrical rod 402 is a hollow transparent code rod. A light source 406 is positioned within the hollow rod, as opposed to externally with the encoder of FIG. 1. The light source is a distributed source of (coherent or incoherent) radiation in the wavelength region to which the detecting array is sensitive, typically the visible and near infrared. Since the light source could be mounted on the axis inside the rod and proximity focusing could be used, a more compact device is possible due to the elimination of the cylindrical lens. An off-axis fiber optic light source may provide a hollow transparent code rod with sufficient illumination to permit the proximity focusing configuration with both types of rotation tables. The thick wall of the hollow code rod acts as a light pipe.

Light emitted from light source 406 is transmitted through encoded surface 404 and detected by light detecting linear array 408, such as an array of photodetectors. As rod 102 rotates, the encoded pattern on encoded surface 404 shifts and its position is detected by light detecting linear array 408 to determine an absolute angular position.

In consideration of the above embodiments, wherein encoded surface 404 may be illuminated from either outside the encoder rod or from within, code lines can be formed which have various optical reflectivity or transmissivity, and may be generally characterized by the term optical density (in reflection or transmission). Thus, code lines may have a top hat, Gaussian, periodic sine, or other periodic variation in optical density of either reflection or transmission, where the periodicity is the spatial frequency of the repetition of lines in a segment. Other examples of line pattern intensity may include, for example, but are not limited to, saw-tooth, cycloidal, etc. An example of a line code pattern employed for position detection is disclosed in U.S. Pat. No. 7,135,673.

Embodiments described above illustrate but do not limit the invention. It should also be understood that numerous modifications and variations are possible in accordance with the principles of the present invention. For example, a top hat Gaussian or sine function code pattern is described herein. However, the code pattern for the encoded rod can be any suitable pattern, such as a random code pattern, a pseudo-random code pattern, or a Gray code pattern. Accordingly, the scope of the invention is defined only by the following claims.

What is claimed is:

1. An absolute encoder, comprising:
   a light source;
   an encoded code rod with an axis of rotation, wherein the rod has an outer surface encoded with code marks configured in a plurality of adjacent segments along the axis of rotation of the rod for determining angular rotation position, wherein a first one of the segments comprises a straight single diagonal code line offset from the axis of rotation by a first non-zero angle and a second one of the segments comprises a plurality of straight parallel diagonal code lines offset from the axis of rotation by a second non-zero angle less than the first non-zero angle; and
   a light detector configured to detect light reflected from or transmitted through the code marks;
   wherein the light detector is configured to detect a first axial position of a first point of intersection between the single diagonal code line of the first segment and a first line defined by a first portion of the light detector, and configured to detect a second axial position of a second point of intersection between one of the plurality of straight parallel diagonal code lines of the second segment and a second line defined by a second portion of the light detector, wherein the first and second points of intersection move along the length of the code rod as the rod rotates.

2. The encoder of claim 1, wherein the code marks of each segment comprises one or more diagonal code lines offset from the axis of rotation of the code rod by a non-zero angle.

3. The encoder of claim 2, wherein the non-zero angle is determined by a width dimension of the segment parallel to the axis of rotation, the number of code lines in the segment, and the diameter of the encoder rod outer surface.

4. The encoder of claim 2, wherein a first segment is identical to and rotationally offset from a second segment.

5. The encoder of claim 4, wherein the offset is by a fraction of one code mark.

6. The encoder of claim 2, wherein the number of code lines in a one of the segments is between the number of code lines in two adjacent ones of the segments.

7. The encoder of claim 2, wherein the number of code lines in a first one of the segments is between the number of code lines in two non-adjacent ones of the segments.

8. The encoder of claim 1, wherein the encoded code rod further comprises one or more reference lines extending continuously around the circumference of the rod, substantially perpendicular to the axis of rotation.

9. The encoder of claim 8, wherein the encoded code rod further comprises two or more reference lines extending continuously around the circumference of the rod, substantially perpendicular to the axis of rotation, and wherein the distance between two of the reference lines provides reference locations for determining the position of code marks in each of the segments.

10. The encoder of claim 8, wherein the encoded code rod further comprises two or more reference lines extending continuously around the circumference of the rod, substantially perpendicular to the axis of rotation, and wherein the distance between reference lines provides reference dimensions for correcting for axial wobble of the rod and/or angular misalignment wobble of the outer surface encoded with code marks.

11. The encoder of claim 1, wherein the light detector comprises a linear array of detectors, the length of the array being at least as long as the length of the code rod.

12. The encoder of claim 2, wherein the code lines have a different reflectance than the background.

13. The encoder of claim 2, wherein the code lines have a different transmissivity than the background.

14. The encoder of claim 2, wherein the code line reflectance or transmittance intensity comprises a top hat function, a Gaussian function, or a periodic pattern of optical reflectivity or transmissivity varying in optical density.

15. The encoder of claim 14, wherein the varying optical density is an offset sine function.

16. The encoder of claim 1, where in the light source is located external to the code rod.

17. The encoder of claim 1, further comprising a cylindrical lens positioned between the light detector and the code rod.

18. The encoder of claim 1, further comprising a linear micro-lens array positioned between the light detector and the code rod, wherein the periodicity and placement of each micro-lens corresponds to each element of the photodetector array.

19. The encoder of claim 1, wherein light source is located within the code rod.

20. A method of determining an absolute angle position of an object, the method comprising:
    providing an encoded code rod having one or more code marks each in a plurality of adjacent segments along the axis of rotation of the rod, wherein a first one of the segments comprises a straight single diagonal code line offset from the axis of rotation by a first non-zero angle and a second one of the segments comprises a plurality of straight parallel diagonal code lines offset from the axis of rotation by a second non-zero angle less than the first non-zero angle;
    rotating the code rod;
    detecting the code marks on the code rod; and
    determining the absolute angle position of the code rod from the detected code marks;
    wherein detecting the code marks comprises:
    detecting a first axial position of a first point of intersection between the single diagonal code line of the first segment and a first line defined by a first portion of a light detector, and detecting a second axial position of a second point of intersection between one of the plurality of straight parallel diagonal code lines of the second segment and a second line defined by a second portion of the light detector, wherein the first and second points of intersection move along the length of the code rod as the rod rotates.

21. The method of claim 20, wherein the detecting comprises:
    reflecting light from the code marks; and
    detecting the reflected light intensity corresponding to the code marks.

22. The method of claim 20, wherein the detecting comprises:
    transmitting light through the encoder rod containing the code marks; and
    detecting the transmitted light intensity corresponding to the code marks.

23. The method of claim 20, wherein the code marks are one or more diagonal code lines offset from the axis of rotation of the code rod by a non-zero angle, and wherein the non-zero angle of the code lines is determined by a width dimension of the segment comprising the code lines parallel to the axis of rotation, the number of code lines in the segment, and the diameter of the encoder rod outer surface.

24. The method of claim 20, wherein the code rod further comprises one or more reference lines orientated approximately perpendicular to the axis of rotation of the code rod, extending the entire circumference of the code rod.

25. The method of claim 24, wherein the determining comprises measuring the relative position of the detected code mark of the code line and the one or more reference lines.

26. The method of claim 25, wherein the code rod further comprises two or more reference lines, and wherein the determining further comprises determining the distance between two reference lines to provide reference dimensions for correcting for axial wobble of the rod and/or angular misalignment wobble of the outer surface encoded with code marks.

27. The method of claim 20, wherein the code marks have a detected intensity format that may be selected from the group including top hat, Gaussian and periodic.

28. The method of claim 27, wherein the periodic intensity format is a sine wave.

29. The method of claim 20, wherein the detecting the code marks comprises:
    illuminating the code marks; and
    detecting the code marks with a light detector, wherein the light detector is a line array of detectors configured parallel to the rotation axis of the encoded rod.

30. The method of claim 20, wherein the number of code lines in one of the segments is between the number of code lines in two adjacent ones of the segments.

31. The method of claim 20, wherein the number of code lines in a first one of the segments is between the number of code lines in two non-adjacent ones of the segments.

32. An absolute encoder comprising:
    an encoded code rod having one or more code marks each in a plurality of adjacent segments along the axis of rotation of the rod, wherein a first one of the segments comprises a straight single diagonal code line offset from the axis of rotation by a first non-zero angle and a second one of the segments comprises a plurality of straight parallel diagonal code lines offset from the axis of rotation by a second non-zero angle less than the first non-zero angle;
    means for rotating the code rod;
    means for detecting the code marks on the code rod, the means for detecting the code marks comprising means for detecting a first axial position of a first point of intersection between the single diagonal code line of the first segment and a first line defined by a first portion of a light detector, and means for detecting a second axial position of a second point of intersection between one of the plurality of straight parallel diagonal code lines of the second segment and a second line defined by a second portion of the light detector, wherein the first and second points of intersection move along the length of the code rod as the rod rotates;
    means for determining the absolute angle position of the code rod from the detected code marks;
    means for detecting axial and angular misalignment wobble; and
    means for correcting errors due to wobble.

* * * * *